(12) United States Patent
Wakjira et al.

(10) Patent No.: US 11,988,879 B2
(45) Date of Patent: May 21, 2024

(54) STEPPED FERRULE SEATING IN AN MTP INNER HOUSING

(71) Applicant: US Conec Ltd., Hickory, NC (US)

(72) Inventors: Jillcha F. Wakjira, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 18/460,654

(22) Filed: Sep. 4, 2023

(65) Prior Publication Data

US 2023/0408775 A1 Dec. 21, 2023

Related U.S. Application Data

(63) Continuation of application No. 17/402,472, filed on Aug. 13, 2021, now Pat. No. 11,768,336, which is a continuation of application No. 16/680,107, filed on Nov. 11, 2019, now Pat. No. 11,092,757, which is a continuation of application No. 15/811,653, filed on Nov. 13, 2017, now Pat. No. 10,473,865.

(60) Provisional application No. 62/421,354, filed on Nov. 13, 2016.

(51) Int. Cl.
*G02B 6/38* (2006.01)

(52) U.S. Cl.
CPC .......... *G02B 6/3869* (2013.01); *G02B 6/381* (2013.01); *G02B 6/3833* (2013.01); *G02B 6/3873* (2013.01); *G02B 6/3885* (2013.01); *G02B 6/3897* (2013.01)

(58) Field of Classification Search
None
See application file for complete search history.

(56) References Cited

U.S. PATENT DOCUMENTS 6,402,388 B1 * 6/2002 Imazu .................. G02B 6/3885
385/60

* cited by examiner

*Primary Examiner* — Chad H Smith
(74) *Attorney, Agent, or Firm* — Michael L Leetzow PLLC; Shubhrangshu Sengupta

(57) ABSTRACT

A fiber optic ferrule and a fiber optic connector housing make contact only along two sides of the fiber optic ferrule when in an unmated condition. One of the fiber optic ferrule and the fiber optic connector housing have been modified such that only two of the surfaces engage one another. The shoulders can be shortened, lengthened, or have a projection added to the current surfaces.

20 Claims, 12 Drawing Sheets

STEPPED FERRULE SEATING IN AN MTP INNER HOUSING

REFERENCE TO RELATED CASE

This application claims priority under 35 U.S.C. § 119 (e) to provisional application No. 62/421,354 filed on Nov. 13, 2016, and under 35 U.S.C. § 120 to U.S. Pat. No. 10,473,865 issued on Nov. 12, 2019, to U.S. Pat. No. 11,092,757 issued on Aug. 17, 2021, and to U.S. patent application Ser. No. 17/402,472, filed on Aug. 13, 2001, the contents of which are hereby incorporated by reference in their entirety.

BACKGROUND OF THE INVENTION

Field of the Invention

Fiber optic ferrules, installed in fiber optic connectors, make contact with other fiber optic ferrules when two fiber optic connectors are mated together. There is a force required to ensure that the front faces of the fiber optic ferrules make contact with one another during mating. Recently, the force to be applied to the mating fiber optic ferrules has been more than doubled to ensure proper contact of the fiber optic ferrules and the optical fibers secured therein. This means that the springs in the fiber optic connectors are stronger and exert a larger force on the back of the fiber optic ferrule. When two fiber optic connectors are unmated, the fiber optic ferrule is able to move forward in the inner housing of the fiber optic connector where a shoulder on the fiber optic ferrule makes contact with a corresponding shoulder that extends around the inside of the inner housing. The new, larger spring force is causing the shoulder on the fiber optic ferrule to be damaged. The fiber optic ferrule has two short sides to the shoulder and two longer sides. If only the longer sides of the fiber optic ferrule's shoulder makes contact with the shoulder on the inside of the inner housing, then the damage to the fiber optic ferrule is greatly reduced.

SUMMARY OF THE INVENTION

The present invention is directed to a combination of a fiber optic ferrule and a fiber optic connector housing that includes a fiber optic ferrule having a first pair of shoulders on a first pair of opposite sides of the fiber optic ferrule lying in a first plane and a second pair of shoulders on a second pair of opposite sides of the fiber optic ferrule lying in a second plane, and a fiber optic connector housing that includes a main body having an interior surface defining a main opening extending through the main body to receive at least a portion of the fiber optic ferrule, a third pair of shoulders extending into the main opening from the interior surface, the third pair of shoulders disposed on opposite sides of the main opening and lying in a third plane, and a fourth pair of shoulders extending into the main opening from the interior surface, the fourth pair of shoulders disposed on a second pair of opposing sides of the main opening and lying in a fourth plane, wherein at least one pair of the first and second planes and the third and fourth planes are spaced apart from one another.

In some embodiments, all four planes are spaced apart from one another in a mated configuration.

In some other embodiments, the first and third planes lie in the same plane when the fiber optic ferrule and fiber optic connector housing are in an unmated configuration.

In another embodiment, one of the pair of shoulders on the fiber optic ferrule have at least one surface extending away therefrom and lying in fifth plane, the fifth plane being parallel to and spaced apart from the first and second planes.

According to another aspect of the present invention, the present invention is directed to a fiber optic ferrule that includes a first pair of shoulders on a first pair of opposite sides of the fiber optic ferrule lying in a first plane, a second pair of shoulders on a second pair of opposite sides of the fiber optic ferrule lying in a second plane, the first and second planes being parallel and spaced apart from one another.

According to yet another aspect of the present invention, the present invention is directed to a fiber optic connector housing that includes a main body having an exterior surface and an interior surface, the main body extending between a front end and a rear end, a main opening extending through the main body between the front and rear ends, the main opening at least partially defined by the interior surface of the main body, a first pair of shoulders extending into the main opening from the interior surface, the first pair of shoulders disposed on opposite sides of the main opening and lying in a first plane, and a second pair of shoulders extending into the main opening from the interior surface, the second pair of shoulders disposed on a second pair of opposing sides of the main opening and lying in a second plane, the first and second planes being parallel and spaced apart from one another.

And the present invention is also directed to a fiber optic connector housing that includes a main body having an exterior surface and an interior surface, the main body extending between a front end and a rear end, a main opening extending through the main body between the front and rear ends, the main opening at least partially defined by the interior surface of the main body, and four shoulders extending into the main opening from the interior surface, at least one of the four shoulder lying in a first plane and at least two of other of the four shoulders lying in a second plane, the first and second planes being parallel and spaced apart from one another.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION

Figure 1:
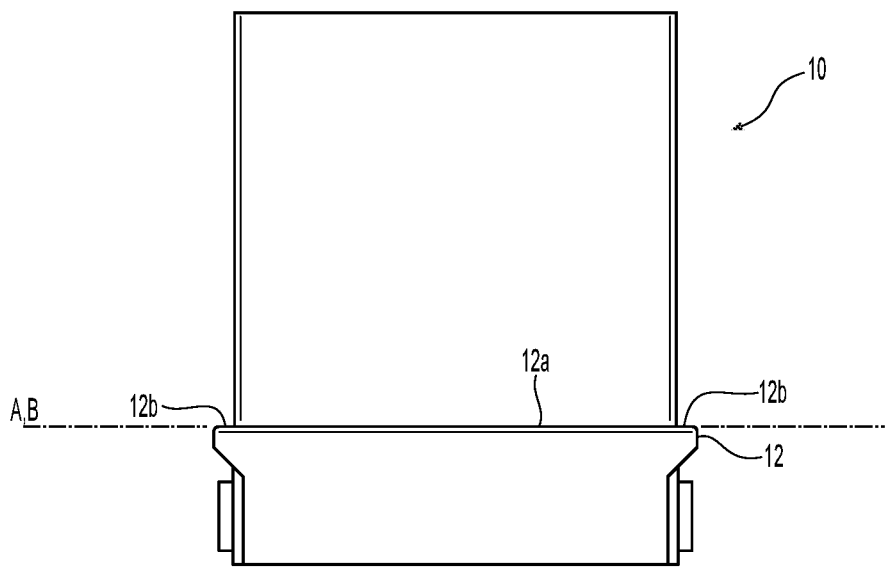
FIG. 1 is a side elevational view of a fiber optic ferrule that can be used with one embodiment of an inner housing according the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
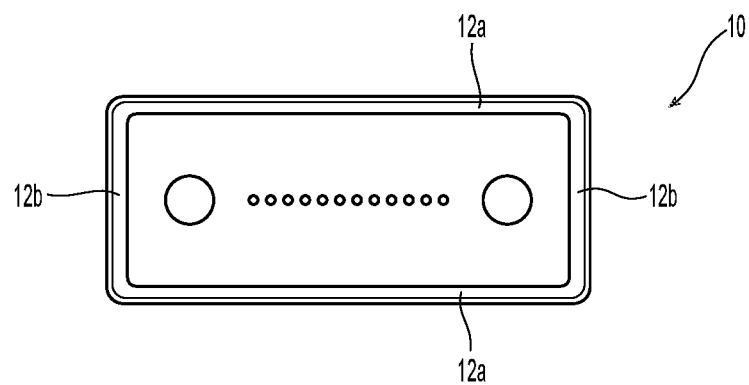
FIG. 2 is an elevational view of the fiber optic ferrule of FIG. 1 from the front thereof showing the engagement surfaces of the fiber optic ferrule.

Referring to FIGS. 1 and 2, a fiber optic ferrule 10 is illustrated. The fiber optic ferrules 10 have a shoulder 12 that extends around the circumference of the fiber optic ferrules 10. Referring to FIG. 2, in looking at the shoulder 12 from the top, the shoulder 12 can be divided into two pairs of shoulders—a first pair of shoulders are two longer segments 12a and the second pair of shoulders are the two shorter segments 12b, corresponding to the longer and shorter sides of the fiber optic ferrule 10. Each pair of shoulders 12a, 12b being on opposing sides of the fiber optic ferrule 10.

Figure 3:
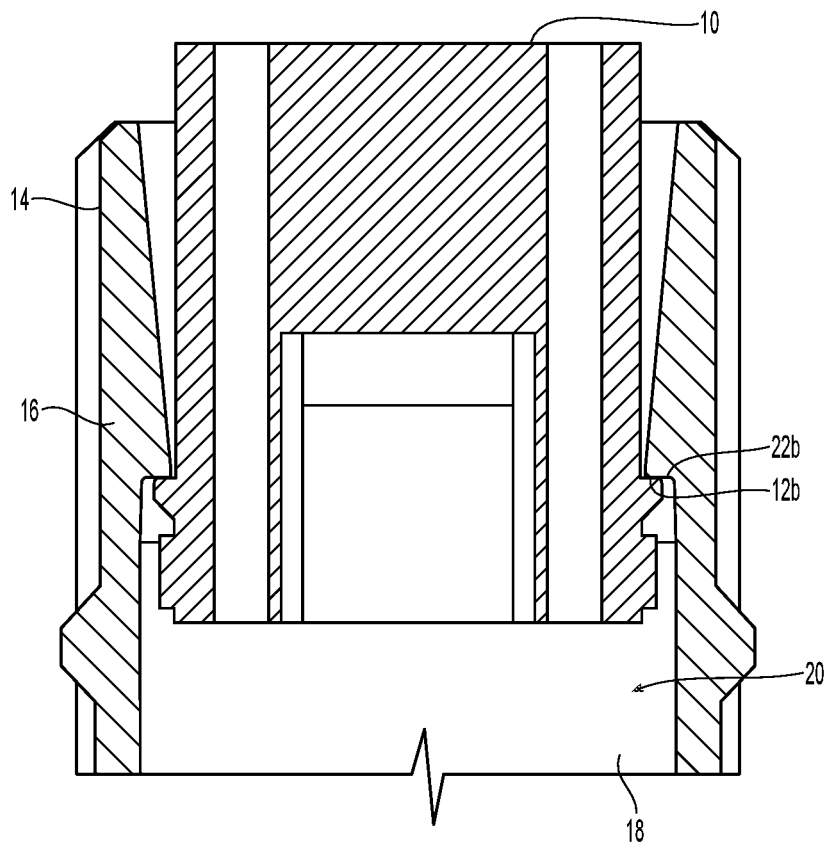
FIG. 3 is a top, cross sectional view of the fiber optic ferrule of FIG. 1 and an inner housing in an unmated configuration.
Figure 4:
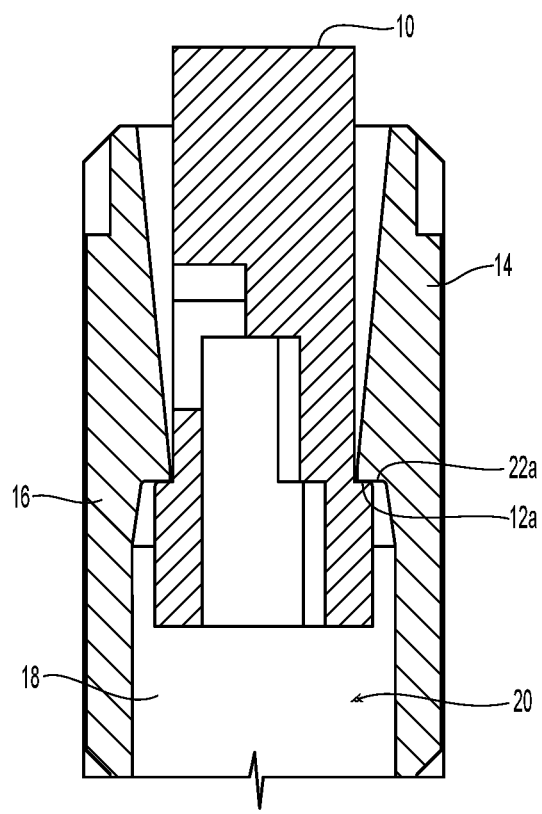
FIG. 4 is a cross sectional view from the side of the fiber optic ferrule and an inner housing in FIG. 3 in an unmated configuration.

FIGS. 3 and 4 illustrate the fiber optic ferrule 10 in an inner housing 14 (with the remainder of the parts of the fiber optic connector removed for clarity) when the fiber optic ferrules 10 are in an unmated condition. The inner housing 14 has a main body 16 with an interior surface 18 that defines a main opening 20 that receives at least a portion of the fiber optic ferrule 10. The fiber optic ferrule 10 is biased (with a spring, not shown) forward in the inner housing 14 so that both pairs of the shoulder 12 of the fiber optic ferrule 10 engage a shoulder 22 of the inner housing 14. The shoulder 22 in the inner housing 14 also can be divided into two pairs of shoulders, a first pair of longer shoulder segments 22a and a second pair of shorter segments 22b. The engagement of the shoulder 12 of the fiber optic ferrule 10 with the shoulder 22 of the inner housing 14 aligns the fiber optic ferrule 10 within the inner housing 14.

Figure 5:
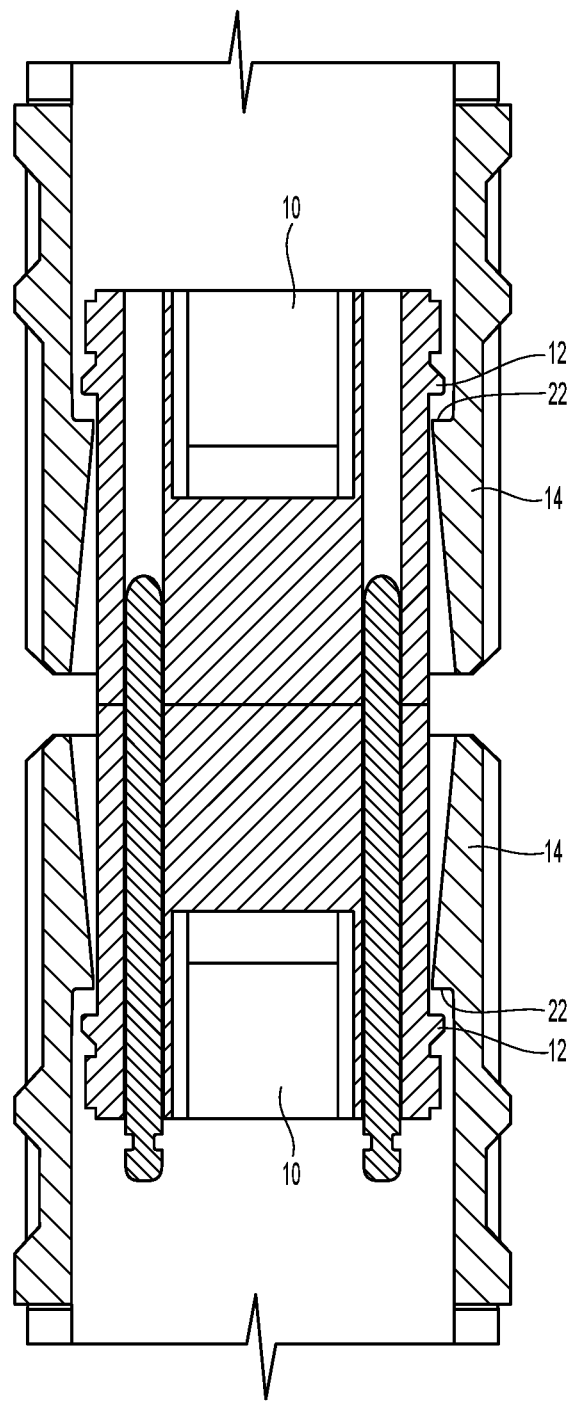
FIG. 5 is a cross sectional view of two fiber optic connectors in a mated configuration with the shoulders of the fiber optic ferrule and the fiber optic connector unengaged.
Figure 6:
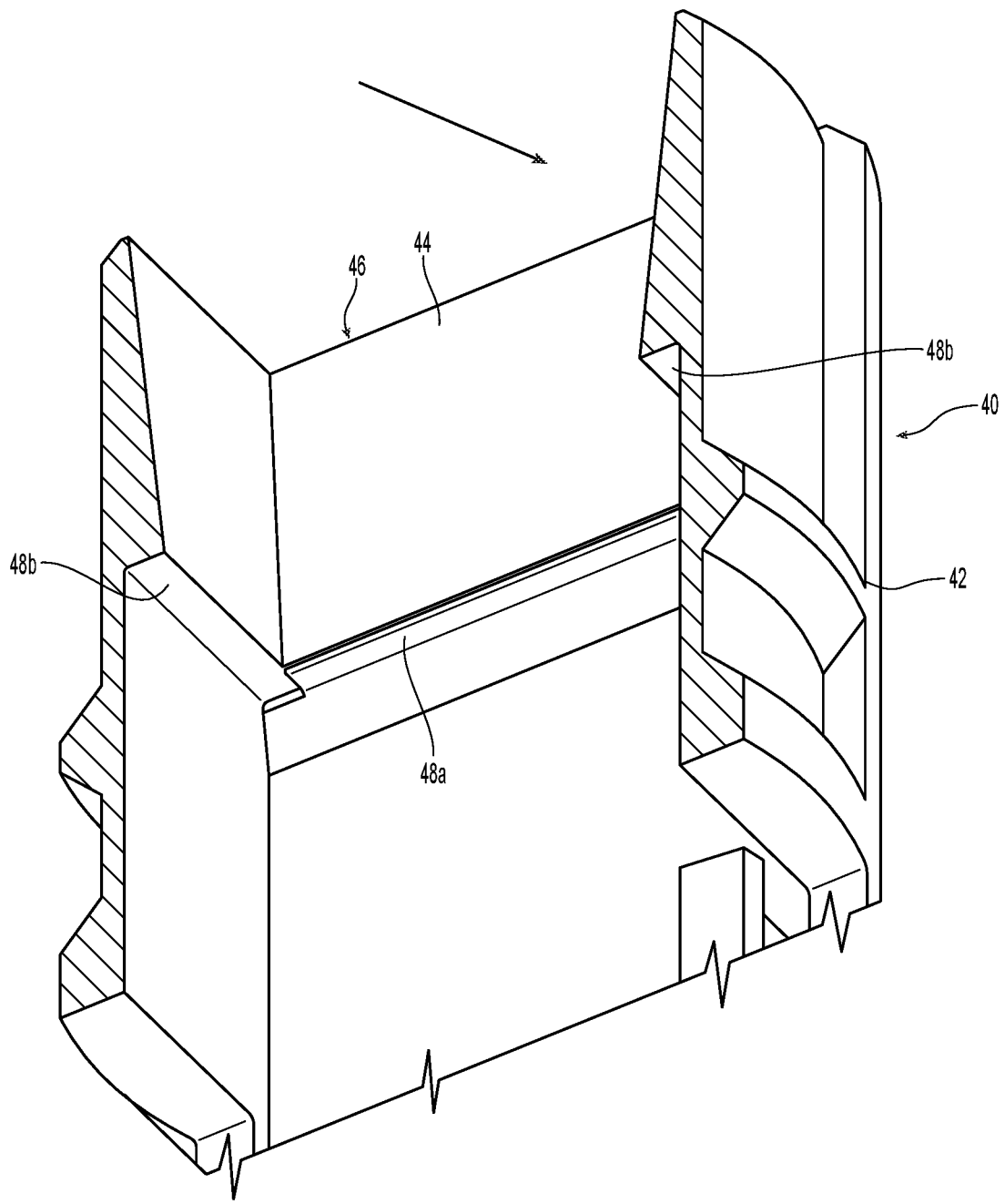
FIG. 6 is a perspective view of cross section from the rear to the front of one embodiment of an inner housing according to the present invention.
Figure 7:
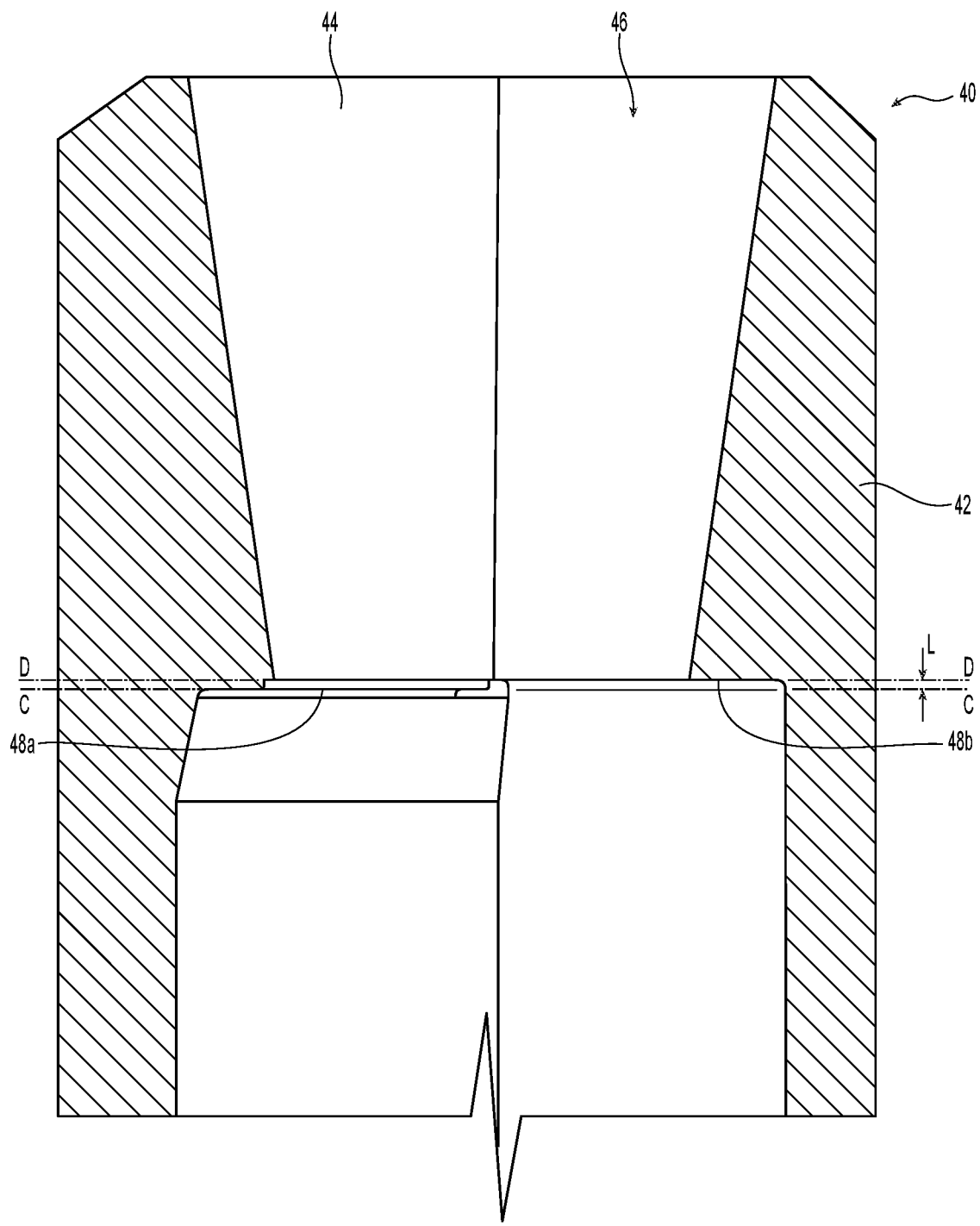
FIG. 7 is a front elevational view of a cross section from one side to an adjacent side of one embodiment of an inner housing according to the present invention as illustrated by the arrow in FIG. 6.

Now referring to FIG. 5, two portions of fiber optic connectors are illustrated as being mated to one another (portions of the connectors and the adapter into which they would be inserted have been removed for clarity). The front faces of the fiber optic ferrules 10 are engaging one another, which causes the pair of shoulders 12 on each of the fiber optic ferrules 10 to be separated from the shoulders 22 in the inner housings 14. As noted above, springs can now push on the back end of the fiber optic ferrules 10 with a higher force.

Thus, when the fiber optic connectors are disengaged and the fiber optic ferrules 10 move forward in the inner housing 14 to return to the position illustrated in FIGS. 3 and 4, the fiber optic ferrules 10, and in particular the pairs of shoulders 12 of the fiber optic ferrules 10, tend to slam against the shoulder 22 of the inner housing 14, causing damage to the fiber optic ferrules 10. The damage to fiber optic ferrules 10 has been found to be along the short shoulder portion 12b.

A new inner housing 40 is illustrated in FIGS. 6-9, the inner housing 40 has a main body 42 with an interior surface 44 that defines a main opening 46 that receives at least a portion of the fiber optic ferrule 10. The inner housing 40 has two pairs of shoulders 48a, 48b that extend around the periphery of the interior surface 44 of the inner housing 40, the pairs of shoulders being disposed on opposite sides of the main opening 46. The second of the pair of shoulders 48a is not visible in FIG. 6, but is the same as the one illustrated. The first pair of shoulders 48a are longer than the second pair of shoulders 48b. To avoid the damage to the shoulder portion 12b, the shorter pair of shoulders 48b are recessed (moved towards the front end) relative to the two long sides 48a by a distance L. See FIG. 8.

Preferably the distance L or the recess is about 75 microns, but could be more or less. As a result, the shoulder 12 of the fiber optic ferrule 10 does not engage all of the shoulders 48a and 48b in the inner housing 40. More particularly, the shoulder segment 12a of the fiber optic ferrule 10 engages the two long sides 48a while the shorter shoulder segments 12b of the fiber optic ferrule 10 do not engage the two short sides 48b due to the recess.

Each of the pairs of shoulders 12a, 12b and 48a, 48b lie in a plane. In fiber optic ferrule 10, the pair of shoulders 12a line in a plane A and the pair of shoulders 12b lie in a plane B. In the embodiment of fiber optic ferrule 10 in FIGS. 1 and 2, plane A and plane B both lie in the same plane. In the inner housing 40, the first pair of shoulders 48a lie in plane C and second pair of shoulders 48b lie in plane D, where plane C and plane D are parallel to but separated from one another by the distance L.

Figure 8:
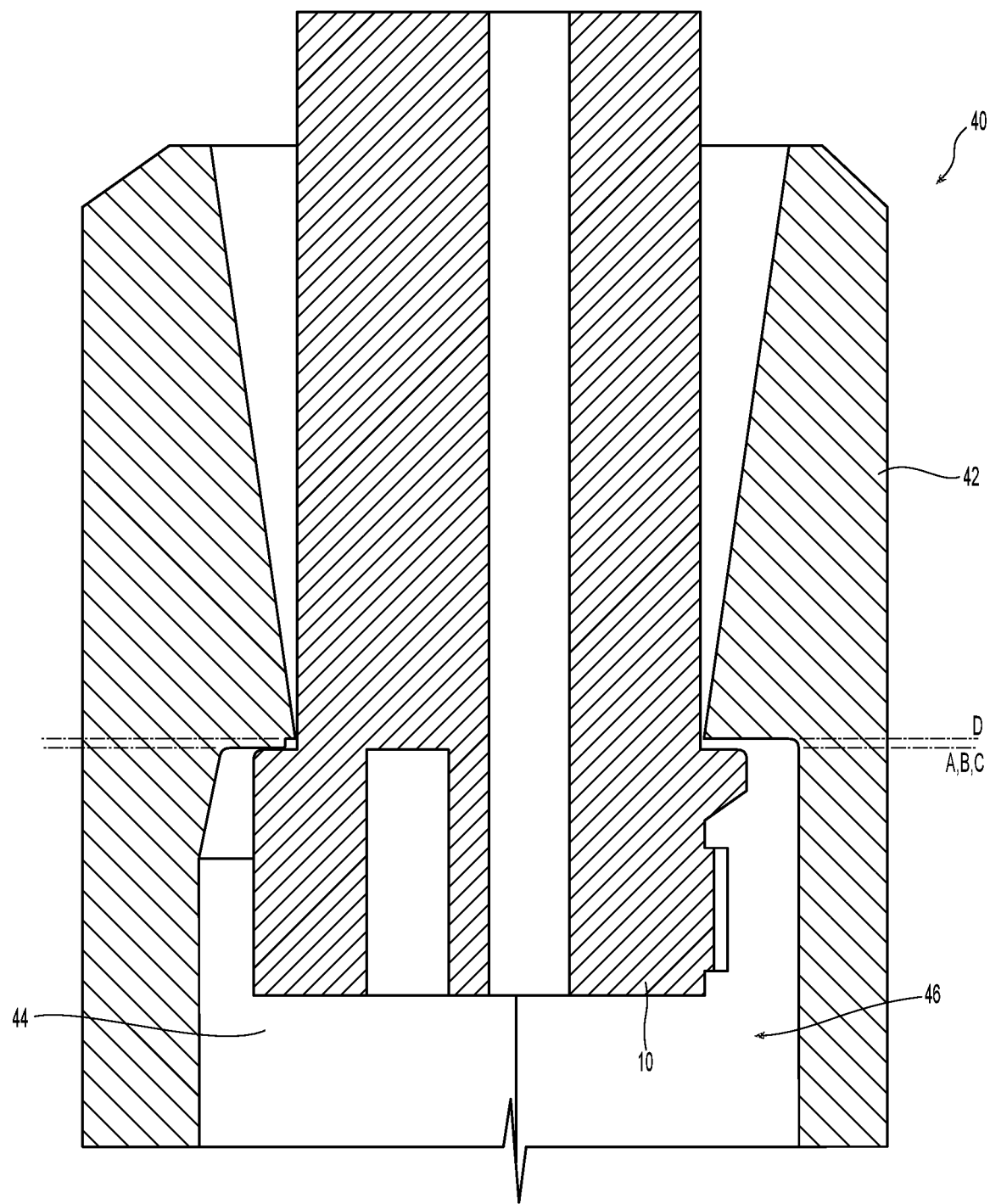
FIG. 8 is a cross section from one side to an adjacent side of a fiber optic ferrule and the inner housing in FIG. 7 in an unmated condition
Figure 9:
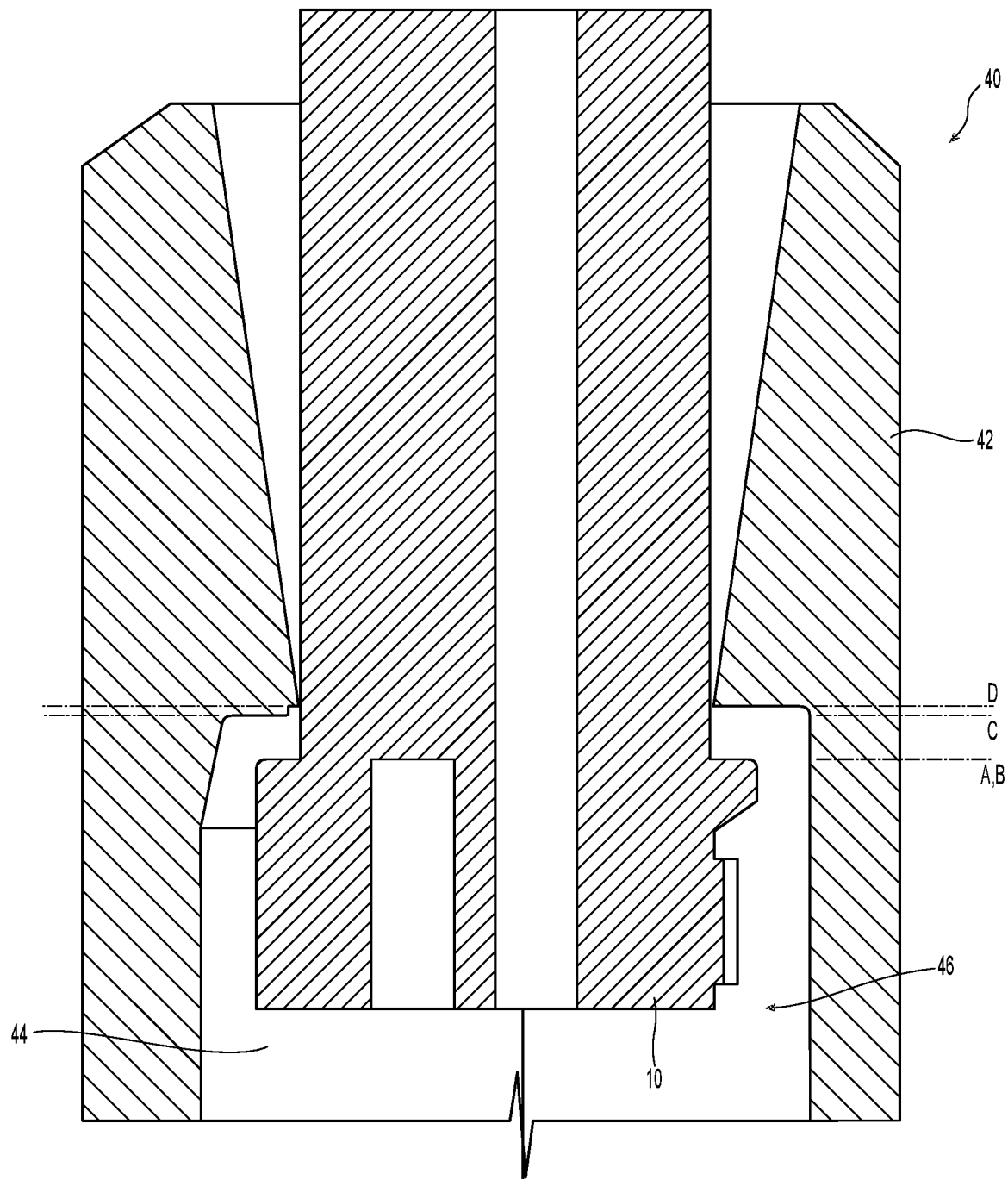
FIG. 9 is a cross section from one side to an adjacent side of a fiber optic ferrule and the inner housing in FIG. 7 in a mated condition.

Turning now to FIGS. 8 and 9, the fiber optic ferrule 10 is illustrated in inner housing 40 in an unmated and condition, respectively. Thus, the shoulders 12a of the fiber optic ferrule 10 will engage the shoulders 48a of the inner housing 40. Since the longer pairs of shoulders 12a, 48a in each of the fiber optic ferrule 10 and the inner housing 40 are to engage each other, the planes A and C lie in the same plane in fiber optic ferrule 10. Since planes A and B lie in the same plane, then planes A, B, and C all lie in the same plane, with plane D (for shoulders 48a), parallel to but separated from the other planes by the distance L.

In a mated configuration, plane A and plane B for fiber optic ferrule 10 both lie in the same plane, and plane C and plane D are parallel to but separated from one another by distance L. See FIG. 9.

Figure 10:
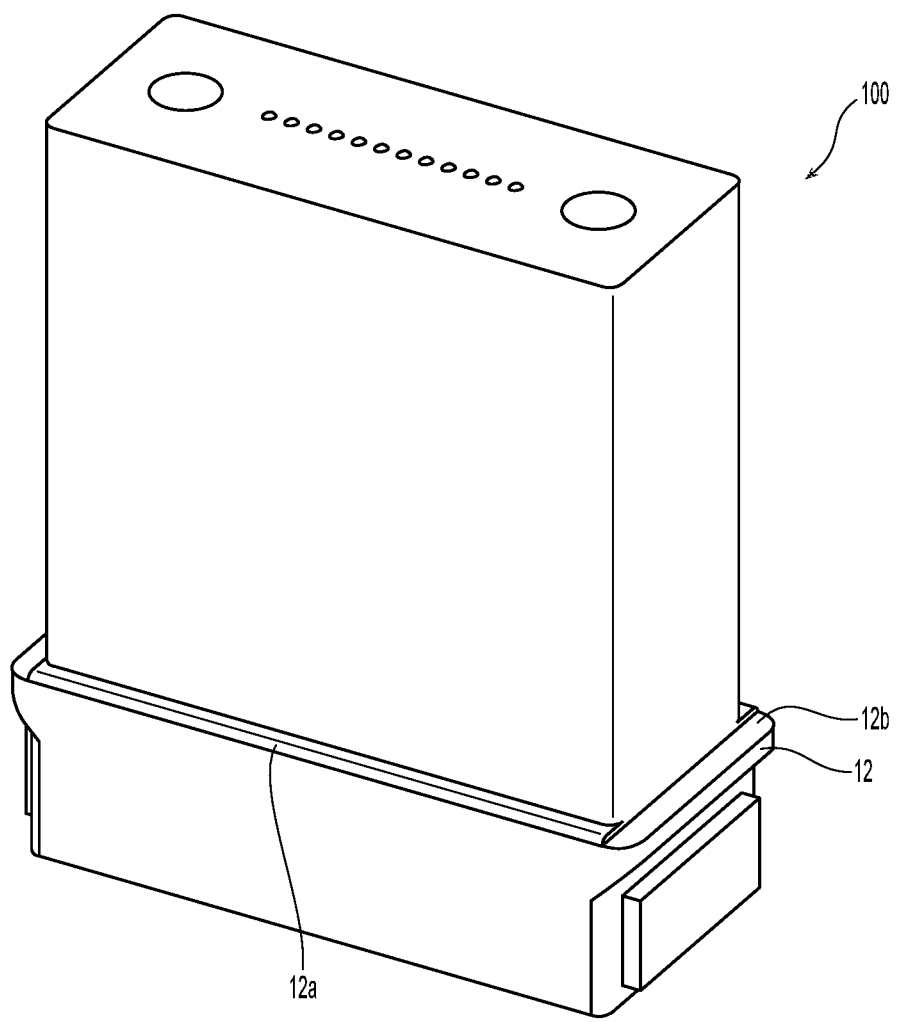
FIG. 10 is a perspective view of an alternative embodiment of a fiber optic ferrule according to the present invention.
Figure 11:
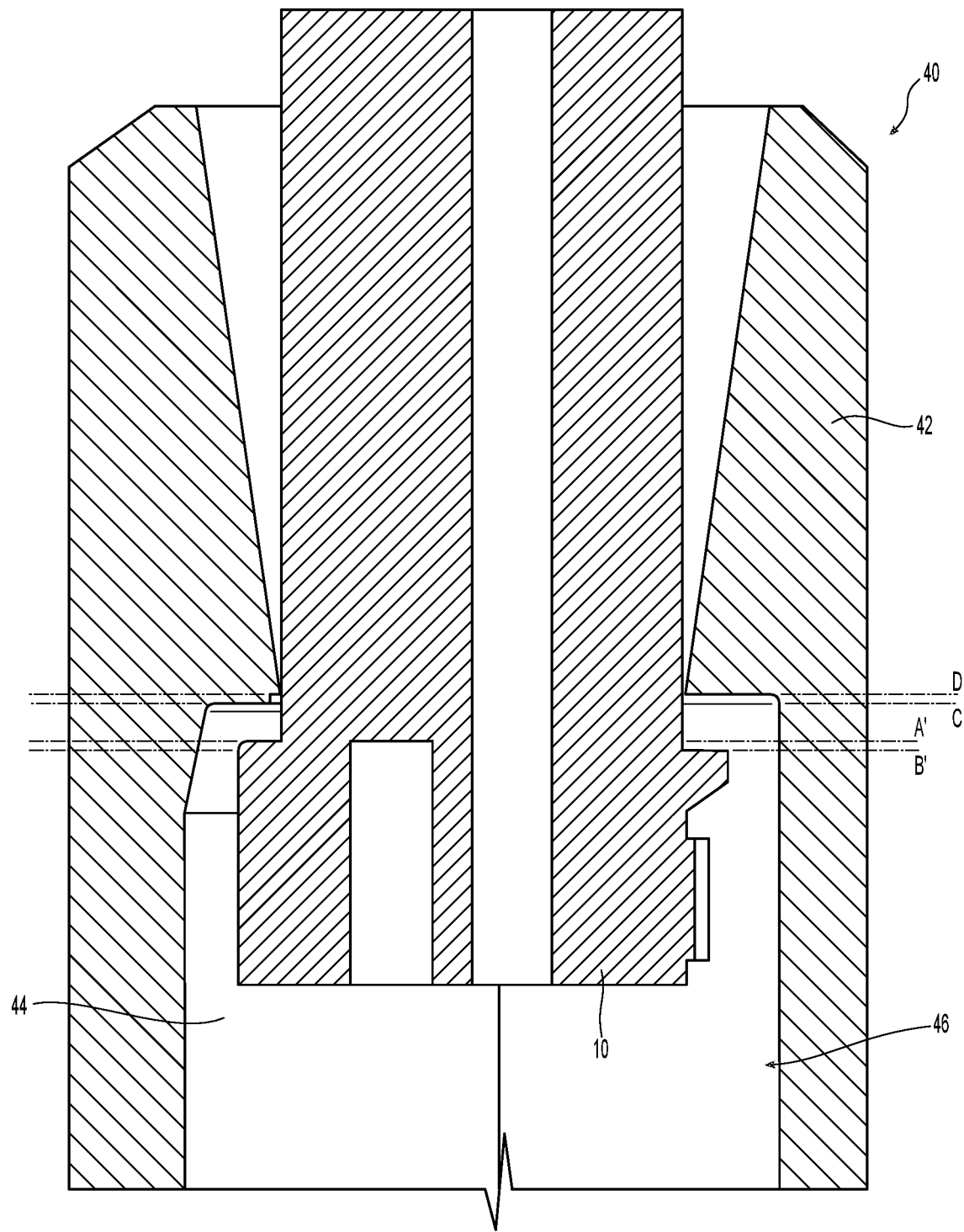
FIG. 11 is a cross section from one side to an adjacent side of an inner housing with the fiber optic ferrule of FIG. 8 in an unmated condition.
Figure 12:
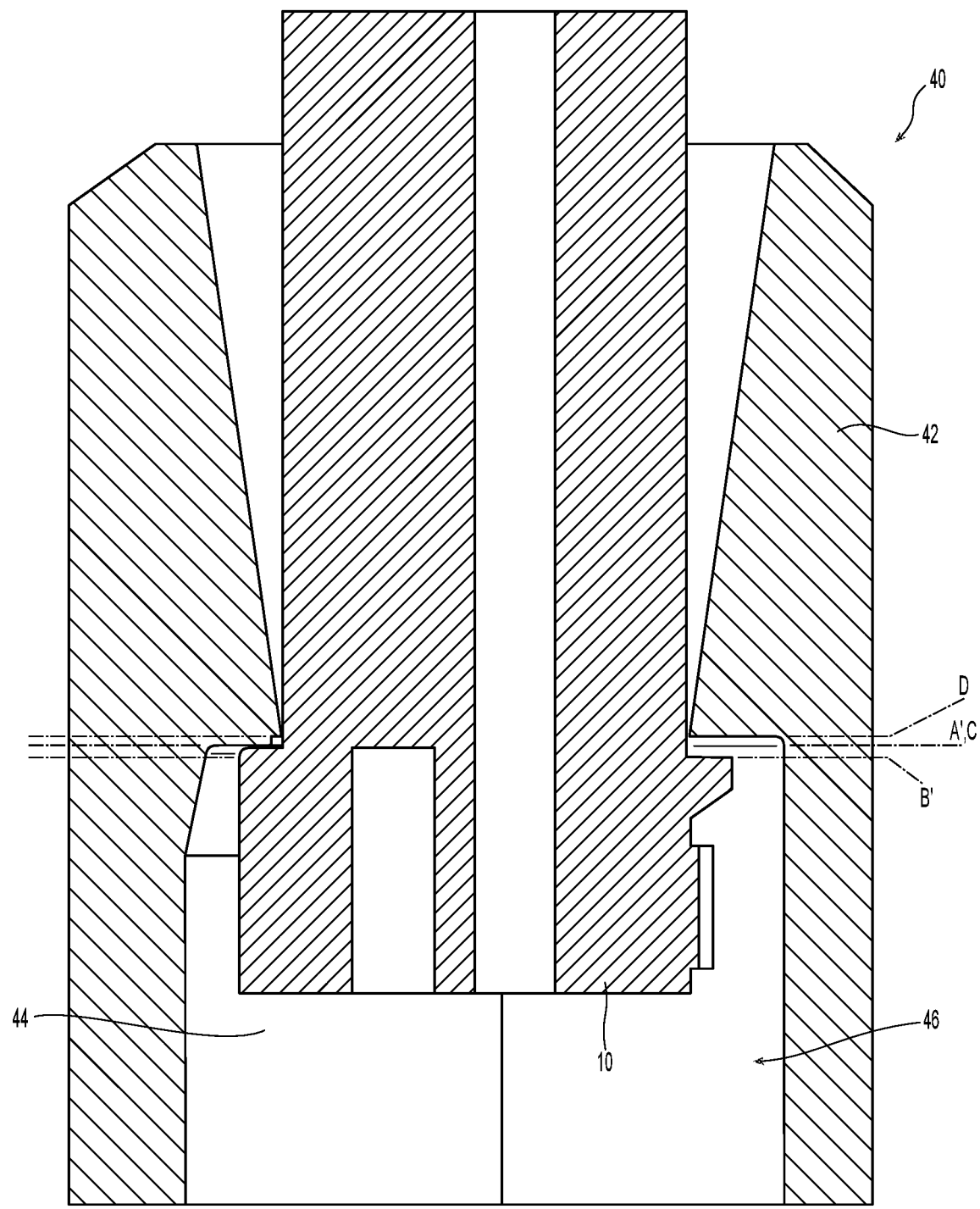
FIG. 12 a cross section from one side to an adjacent side of the fiber optic ferrule and housing of FIG. 11 in an mated condition.

In another embodiment of a fiber optic ferrule 100, illustrated in FIG. 10, it is also possible that the two pairs of shoulders 112a, 112b are offset from one another. In this case, the shorter pair of shoulders 112b would be recessed (so as to not engage a shoulder in an inner housing 14 and 40). In this case, then planes A' and B' would be parallel to but separated from one another by distance L. See FIGS. 11 and 12. Thus, in an mated condition for fiber optic ferrule 100 and the inner housing 40, the four planes A', B', C and D would be parallel but offset from one another. See FIG. 11. However, in an unmated condition, planes A' and C lie in the same plane, while planes B' and D lie on opposites sides of and spaced away from planes A and C. See FIG. 12.

Figure 13:
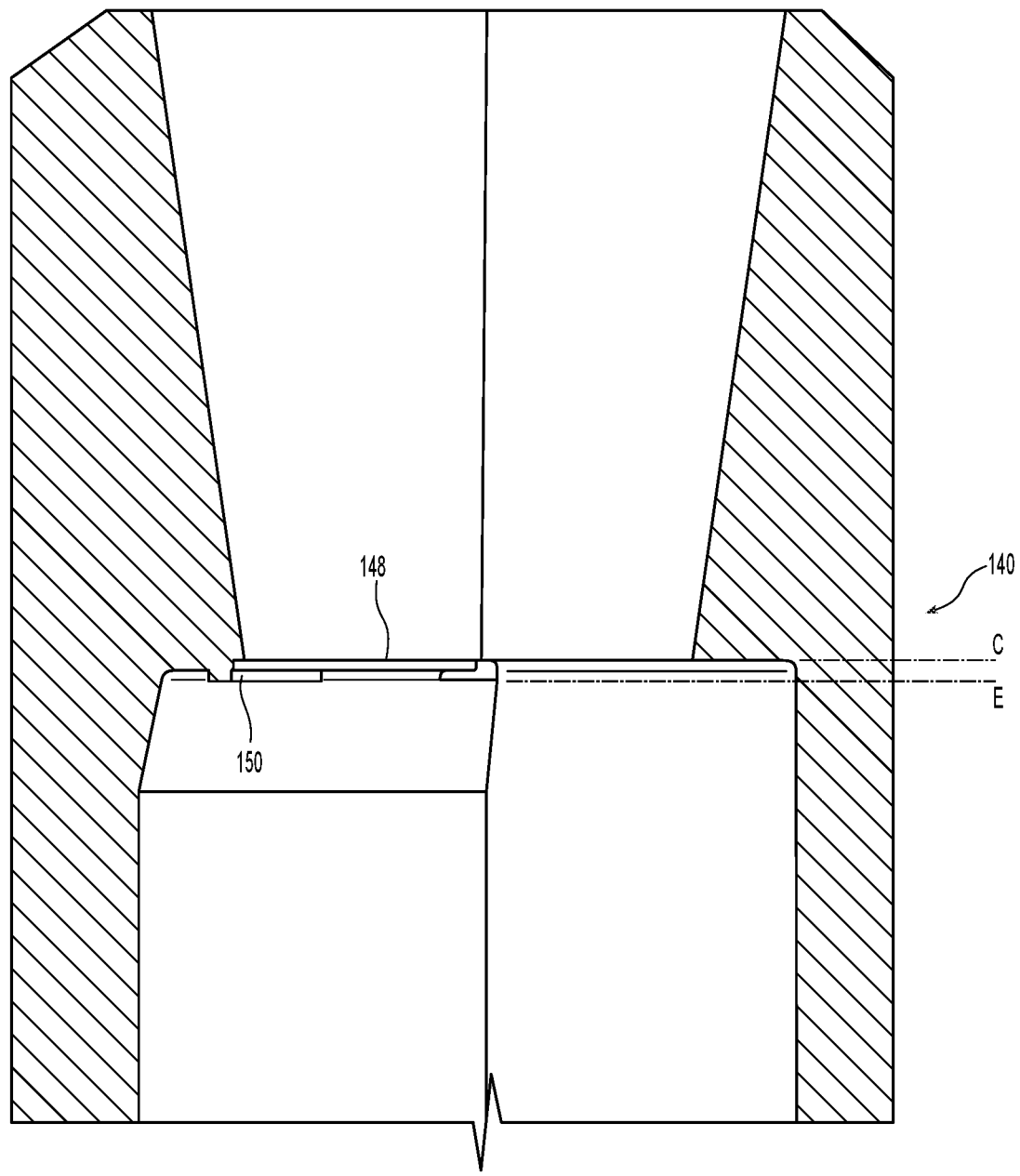
FIG. 13 is a cross section of another embodiment of an inner housing according to the present invention with projections.
Figure 14:
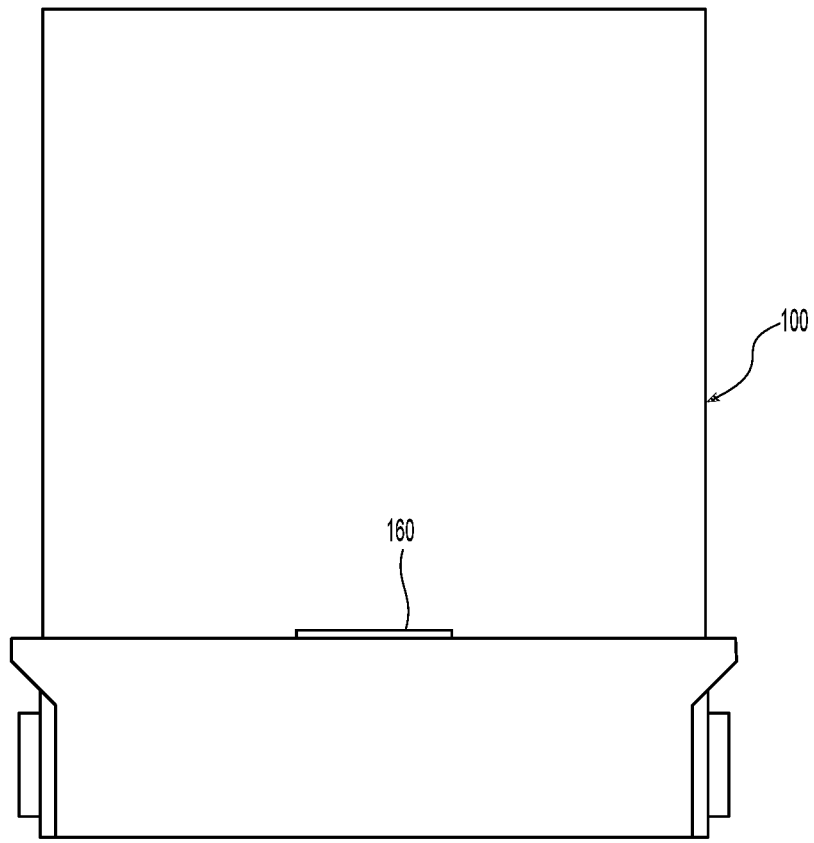
FIG. 14 is elevational view of an alternative embodiment of a fiber optic ferrule according to the present invention

As an alternative to the above fiber optic connectors and inner housings, either of the fiber optic connectors or the inner housings may also have a projection that extends from one of the pairs of shoulders (preferably the long shoulder segments, but they could also be on the short shoulder segments) to provide two additional planes to prevent the shorter of the pairs of shoulders from making contact with each other in the unmated configuration. As illustrated in FIG. 13, one of the pairs of shoulders 148 in inner housing 140 has two projections 150, one on each of the pair of shoulders, the projections 150 extending upward and lying in plane E. The projections 150 in inner housing 140 would engage the pair of shoulders 12a, 112a on the fiber optic ferrules 10, 100. The projections 150 could be used with the standard inner housing 14 or with the revised inner housing 40. Similar projections 160 could be used on the fiber optic ferrules 100 and the pair of shoulders 12a, 112a. See FIG. 14.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A multi-fiber fiber optic connector, comprising:
   a housing having a front end and a rear end, and an opening between the front end and the rear end along a longitudinal axis, the opening surrounded by an interior surface of the housing,
   wherein the housing has a shape defined by a pair of long sides joined by a pair of short sides to form the opening therewithin, and
   wherein the interior surface includes a step extending respectively from each of the pair of long sides into the opening; and
   a multi-fiber ferrule having at least one pair of oppositely placed shoulders on a rear portion and on a pair of long sides of the multi-fiber ferrule, the multi-fiber ferrule configured to receive a plurality of optical fibers terminated at an end face of the multi-fiber ferrule, the multi-fiber ferrule also having a pair of short sides joining the pair of long sides of the multi-fiber ferrule,
   wherein the at least one pair of oppositely placed shoulders include a forward facing surface to engage the step on the each of the pair of long sides of the housing when the multi-fiber ferrule is inserted in the opening of the housing,
   wherein there is a clearance between at least one of the pair of short sides of the multi-fiber ferrule and the interior surface of the housing in an unmated configuration of the multi-fiber fiber optic connector, the clearance extending between the front end and the rear end of the housing all along a length of the multi-fiber ferrule on the at least one of the pair of short sides of the multi-fiber ferrule and at least one of the short sides of the housing, the clearance lying within the opening.

2. The multi-fiber fiber optic connector according to claim 1, further comprising:
   a spring disposed rearward of the multi-fiber ferrule and configured to bias the multi-fiber ferrule toward the front end of the housing.

3. The multi-fiber fiber optic connector according to claim 2, wherein the clearance is maintained when the multi-fiber ferrule is biased in the housing by the spring.

4. The multi-fiber fiber optic connector according to claim 1, wherein the multi-fiber ferrule comprises another pair of oppositely placed shoulders on the rear portion and on the pair of short sides, the clearance extending between the another pair of oppositely placed shoulders on the pair of short sides of the multi-fiber ferrule and the interior surface of the housing.

5. The multi-fiber fiber optic connector according to claim 4, wherein the another pair of oppositely placed shoulders also comprise a forward facing surface.

6. The multi-fiber fiber optic connector according to claim 5, wherein the forward facing surface of the another pair of oppositely placed shoulders is offset from the forward facing surface of the at least one pair of oppositely placed shoulders on the pair of long sides of the multi-fiber ferrule.

7. The multi-fiber fiber optic connector according to claim 1, wherein the multi-fiber ferrule further comprises a pair of guide pin bores extending through the multi-fiber ferrule parallel to the longitudinal axis, each of the pair of guide pin bores being nearer to a respective one of the pair of short sides of the multi-fiber ferrule than to another one of the pair of short sides.

8. The multi-fiber fiber optic connector according to claim 1, wherein there in no contact between the at least one of the pair of short sides of the multi-fiber ferrule and the interior surface of the housing in the unmated configuration of the multi-fiber fiber optic connector.

9. A multi-fiber fiber optic connector, comprising:
   a housing having a front end and a rear end, and an opening between the front end and the rear end along a longitudinal axis, the opening surrounded by an interior surface of the housing,
   wherein the housing has a shape defined by a pair of long sides joined by a pair of short sides to form the opening therewithin, and
   wherein the interior surface includes a step extending respectively from each of the pair of long sides into the opening; and
   a multi-fiber ferrule having at least one pair of oppositely placed shoulders on a rear portion and on a pair of long sides of the multi-fiber ferrule, the multi-fiber ferrule configured to receive a plurality of optical fibers terminated at an end face of the multi-fiber ferrule, the multi-fiber ferrule also having a pair of short sides joining the pair of long sides of the multi-fiber ferrule,
   wherein the at least one pair of oppositely placed shoulders include a forward facing surface to engage the step on the each of the pair of long sides of the housing when the multi-fiber ferrule is inserted in the opening of the housing,
   wherein there is no contact between at least one of the pair of short sides of the multi-fiber ferrule and the interior surface of the housing in an unmated configuration of the multi-fiber fiber optic connector, such that there is a clearance extending between the front end and the rear end of the housing all along a length of the multi-fiber ferrule on the at least one of the pair of short sides of the multi-fiber ferrule and at least one of the short sides of the housing, the clearance lying within the opening.

10. The multi-fiber fiber optic connector according to claim 9, further comprising:
a spring disposed rearward of the multi-fiber ferrule and configured to bias the multi-fiber ferrule toward the front end of the housing.

11. The multi-fiber fiber optic connector according to claim 10, wherein the clearance is maintained when the multi-fiber ferrule is biased in the housing by the spring.

12. The multi-fiber fiber optic connector according to claim 9, wherein the multi-fiber ferrule comprises another pair of oppositely placed shoulders on the rear portion and on the pair of short sides, the clearance extending between the another pair of oppositely placed shoulders on the pair of short sides of the multi-fiber ferrule and the interior surface of the housing.

13. The multi-fiber fiber optic connector according to claim 12, wherein the another pair of oppositely placed shoulders also comprise a forward facing surface.

14. The multi-fiber fiber optic connector according to claim 13, wherein the forward facing surface of the another pair of oppositely placed shoulders is offset from the forward facing surface of the at least one pair of oppositely placed shoulders on the pair of long sides of the multi-fiber ferrule.

15. The multi-fiber fiber optic connector according to claim 9, wherein the multi-fiber ferrule further comprises a pair of guide pin bores extending through the multi-fiber ferrule parallel to the longitudinal axis, each of the pair of guide pin bores being nearer to a respective one of the pair of short sides of the multi-fiber ferrule than to another one of the pair of short sides.

16. The multi-fiber fiber optic connector according to claim 15, wherein the plurality of optical fibers terminate between the guide pin bores.

17. A multi-fiber fiber optic connector, comprising:
a housing having a main body with a front end and a rear end, and an opening between the front end and the rear end along a longitudinal axis passing through the main body, the opening surrounded by an interior surface of the housing,
wherein the main body is defined by a pair of long sides joined by a pair of short sides to form the opening therewithin, and
wherein the interior surface includes a step extending respectively from each of the pair of long sides into the opening; and
a multi-fiber ferrule having a first pair of oppositely placed shoulders on a rear portion and on a pair of long sides of the multi-fiber ferrule and a second pair of oppositely placed shoulders also on the rear portion and on a pair of short sides of the multi-fiber ferrule, the multi-fiber ferrule configured to receive a plurality of optical fibers terminated at an end face of the multi-fiber ferrule, the pair of short sides joined to the pair of long sides of the multi-fiber ferrule,
wherein the first pair of oppositely placed shoulders include a forward facing surface to engage the step on the each of the pair of long sides of the housing when the multi-fiber ferrule is inserted in the opening of the housing, and
wherein there is a clearance between the pair of short sides of the multi-fiber ferrule and the interior surface of the housing in an unmated configuration of the multi-fiber fiber optic connector, the clearance extending between the front end and the rear end of the housing all along a length of the multi-fiber ferrule and at least one of the short sides of the housing, the clearance lying within the opening.

18. The multi-fiber fiber optic connector according to claim 17, further comprising:
a spring disposed rearward of the multi-fiber ferrule and configured to bias the multi-fiber ferrule toward the front end of the housing.

19. The multi-fiber fiber optic connector according to claim 18, wherein the clearance is maintained when the multi-fiber ferrule is biased in the housing by the spring.

20. The multi-fiber fiber optic connector according to claim 17, wherein there is no contact between the at least one of the pair of short sides of the multi-fiber ferrule and the interior surface of the housing in the unmated configuration of the multi-fiber fiber optic connector.

* * * * *